US010939277B2

(12) United States Patent
Bartolomé Rodrigo et al.

(10) Patent No.: US 10,939,277 B2
(45) Date of Patent: Mar. 2, 2021

(54) METHOD OF EXECUTING A SERVICE FOR A SERVICE CONSUMER, AS WELL AS A CORRESPONDING NETWORK NODE AND A COMPUTER PROGRAM PRODUCT

(71) Applicant: Telefonaktiebolaget LM Ericsson (publ), Stockholm (SE)

(72) Inventors: Maria Cruz Bartolomé Rodrigo, Madrid (ES); Miguel Angel Puente Pestaña, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/638,498

(22) PCT Filed: Dec. 4, 2017

(86) PCT No.: PCT/EP2017/081298
§ 371 (c)(1),
(2) Date: Feb. 12, 2020

(87) PCT Pub. No.: WO2019/034268
PCT Pub. Date: Feb. 21, 2019

(65) Prior Publication Data
US 2020/0267530 A1 Aug. 20, 2020

Related U.S. Application Data

(60) Provisional application No. 62/545,038, filed on Aug. 14, 2017.

(51) Int. Cl.
H04W 8/12 (2009.01)
H04W 8/06 (2009.01)
(Continued)

(52) U.S. Cl.
CPC ............... H04W 8/12 (2013.01); H04W 8/06 (2013.01); H04W 48/18 (2013.01); H04W 80/04 (2013.01)

(58) Field of Classification Search
CPC ......... H04W 8/12; H04W 8/06; H04W 48/18; H04W 80/04
See application file for complete search history.

(56) References Cited

U.S. PATENT DOCUMENTS

2005/0276229 A1 12/2005 Torabi
2017/0142571 A1* 5/2017 Skog ..................... H04W 48/18

FOREIGN PATENT DOCUMENTS

EP 1936860 A1 6/2008

OTHER PUBLICATIONS

Unknown, Author, "3rd Generation Partnership Project; Technical Specification Group Services and System Aspects; Procedures for the 5G System; Stage 2 (Release 15)", 3GPP TS 23.502 V0.4.0, May 2017, pp. 1-105.
(Continued)

Primary Examiner — Marisol Figueroa
(74) Attorney, Agent, or Firm — Murphy, Bilak & Homiller, PLLC

(57) ABSTRACT

A method of executing a service for a service consumer, said service consumer being registered in a home telecommunication network and currently residing in a visited telecommunication network, said method comprising the steps of retrieving a list of available services within the home telecommunication network that said service consumer is allowed to access, wherein said SDVN function and said home NRF both reside in said home telecommunication network, receiving a service operation message requesting an operation execution within a particular service for said service consumer in said visited telecommunication net-
(Continued)

work, determining that said home network is able to provide for said requested particular service based on said retrieved list of available service, and selecting one or more service instances for executing said operation within said particular service for said service consumer.

12 Claims, 5 Drawing Sheets

(51) Int. Cl.
*H04W 48/18* (2009.01)
*H04W 80/04* (2009.01)

(56) References Cited

OTHER PUBLICATIONS

Unknown, Author, "3rd Generation Partnership Project; Technical Specification Group Services and System Aspects; System Architecture for the 5G System; Stage 2 (Release 15)", 3GPP TS 23.501 V0.5.0, May 2017, pp. 1-145.

* cited by examiner

US 10,939,277 B2

METHOD OF EXECUTING A SERVICE FOR A SERVICE CONSUMER, AS WELL AS A CORRESPONDING NETWORK NODE AND A COMPUTER PROGRAM PRODUCT

TECHNICAL FIELD

The present invention generally relates to a method of consuming a service by a service consumer, wherein the service consumer is residing in a visited telecommunication network and a service producer is residing in a home telecommunication network. More specifically, the present invention relates to a method of enabling a service consumer to use services at the home telecommunication network.

BACKGROUND

5th generation mobile networks or 5th generation wireless systems, abbreviated 5G, are the proposed next telecommunications standards beyond the current 4G/IMT-Advanced standards.

One of the goals of 5G is that the capacity thereof, compared to traditional 4G networks, is improved such that a higher density of User Equipment, UE in a particular area can be obtained. Further, 5G research and development aims at lower latency than 4G equipment and lower battery consumption, for better implementation of, for example, internet of things, IoT, applications.

One of the foreseen changes, compared to 4G networks, is that traditional peer-to-peer interfaces and protocols are modified by a so called Service Based Architecture, SBA, wherein Network Functions provide one or multiple services to one or multiple service consumers, by means of a protocol that is under evaluation in the 3rd Generation Partnership Project (3GPP).

The 5G System architecture comprises network functions, NF's, which are described in 3GPP TS 23.501 v050 "System Architecture for 5G System", V1.0.0, 2017-06. The functional description of these network functions is specified in clause 6 of that particular Technical Specification.

The above identified Technical Specification described a new Network Function being the Network Repository Function, NRF. The NF Repository Function (NRF) supports the following functionality:

Supports service discovery function. Receive NF Discovery Request from an NF instance, and provides the information of the discovered NF instances to the NF instance.

Maintains the information of available NF instances and their supported services.

One of the drawbacks of the Technical Specification is that it is not described how roaming cases are solved. An end-to-end flow, like UE registration, for a roaming user in a visited network, may require that service consumers in the visited telecommunication network access service producers which reside in the home telecommunication network of the roaming user.

SUMMARY

It is an object of the present invention to provide for an improved method in which a service consumer is enabled to use services in a home telecommunication network of a roaming user, i.e. a user residing in a visited telecommunication network.

It is another object to provide for a network node for supporting execution of a service for a service consumer.

It is a further object to provide for a computer program product, comprising a readable storage medium, comprising instructions which, when executed on at least one processor, cause the at least one processor to carry out the presented method.

In a first aspect of the present disclosure, there is provided a method of consuming a service by a service consumer, said service consumer residing in a visited telecommunication network and consuming said service from a service producer, wherein said service producer is residing in a home telecommunication network. This aspect describes the situation in which a User Equipment, UE, belongs to the home telecommunication network and currently resides in the visited telecommunication network.

The method comprises a first step of retrieving, by a Service Discovery from Visited Network, SDVN, function, from a home Network Repository Function, NRF, a list of available services within the home telecommunication network that said service consumer is allowed to access, wherein said SDVN function and said home NRF both reside in said home telecommunication network.

Further, the method comprises the step of receiving, by said SDVN function, a service operation message requesting an operation execution within a particular service for said service consumer in said visited telecommunication network.

Even further, the method comprises the step of determining, by said SDVN function, that said home network is able to provide for said requested particular service based on said retrieved list of available services.

Finally, the method comprises the step of selecting, by said SDVN function, one or more service instances for executing said operation within said particular service for said service consumer.

As mentioned above, the present disclosure is directed to the situation that the User Equipment, UE, is roaming, i.e. the UE currently resides in a visited telecommunication network and that UE is actually registered in the home telecommunication network, wherein the home telecommunication network differs from the visited telecommunication network.

The service consumer may, for example, be a visited Access and Mobility Management Function, AMF, or any other Network Function residing in the visited telecommunication network.

The differentiation between a home telecommunication network and visited telecommunication network is technically given by the type of subscriber entry for the User Equipment, UE, in a specific network. If a UE has no entry in the home subscriber register of the network, e.g. home location register, HLR, in GSM networks, or Unified Data Management, UDM, —User Data Repository, UDR, the required subscriber data may first to be requested by the visited telecommunication network from the UE's home network.

The roaming UE may, in a 4G network, acquire an entry in a user database of the visited network, e.g. visitor location register, VLR, and the authorized network services are enabled. For the roaming procedure in practice, the possibility of assigning the subscriber data is performed in order that authentication, authorization and billing of the subscriber can be executed in the corresponding network. Thus, the term roaming is not linked to a specific network standard, but rather to the type of subscriber entry in the home subscriber register of the telecommunication network.

The present disclosure is directed to the introduction of a new network function, namely the Service Discovery from Visited Network, SDVN, function. The SDVN function resides in the home telecommunication network of the UE. The SDVN function may be implemented in a stand-alone network node or may be integrated in, for example, a gateway node.

It is noted that the SDVN function may act as an intermediate service consumer in the home telecommunication network for all the services that are required to be accessed from a visited telecommunication network.

The inventors have found that services may not be directly exposed and accessed from a visited telecommunication network due to security and authentication issues. These issues have been resolved by the introduction of the SDVN function.

In a step of the presented method, the SDVN function retrieves, from a home NRF, a list of available services within the home telecommunication network that said service consumer is allowed to access.

As an alternative, the service producer may register services in the SDVN directly, in case these services may potentially be accessed from another telecommunication network, for example the visited telecommunication network. Such a registration act does not, necessarily, need to be performed upon request by the SDVN, it may be initiated by the service producer itself.

Once such a step has been performed, the SDVN function is aware of the particular services that are allowed to be accessed, for example executed, from a visited telecommunication network. The list of available services may be related to a generic list of services which are all available for any service consumer. Alternatively, the list of available services may be tailored to particular service consumers.

At a certain point in time, the SDVN function will receive a service operation message requesting an operation execution within a particular service for said service consumer in said visited telecommunication network. That is, the service operation message originates from the visited telecommunication network, for example from a visited Access and Mobility Management Function, AMF, node, wherein that particular message is directed to a request for initiating a service for the service consumer in the visited telecommunication network.

The SDVN function will then determine whether the requested service may be accessed from the visited telecommunication network based on the retrieved list of available services. That is, if the particular service is present in the list of available services, the SDVN function will determine that the home telecommunication is in fact able to provide for the service.

Finally, the SDVN function will select one or more service instances for executing said operation within said particular service for said service consumer as this was the initial request from that service consumer.

It is noted that a subsequent request for a same service may follow the same procedure as disclosed above.

It is noted that a subsequent request for a same service may also follow a different procedure as disclosed above. That is, the service consumer may be provided with means to directly execute subsequent operation to the same service producer. This may require to open ports in intermediate gateways, like the edge routers present in the telecommunication networks.

One of the advantages of the presented method is that service consumers in the visited telecommunication network are able to consume services produced in the home telecommunication network by a service producer. This situation is directed to roaming User Equipment, UE, i.e. UE's that reside in a Visited Public Land Mobile Network, VPLMN, and actually belong to the home telecommunication network, i.e. the Home Public Land Mobile Network, HPLMN.

One of the specific advantages of the present method is that the introduction of the SDVN function safeguards security and authentication aspects related to the service consumer and/or the service producer.

The present disclosure is mainly discussed with respect to a 5G telecommunication network. It is however noted that the present method may be applicable for any type of telecommunication network, especially for telecommunication networks that are based on a Service Based Architecture, SBA.

In the context of the present disclosure, a service consumer may be any Network Function, NF, or network node in the visited telecommunication network.

It is noted that the present disclosure describes the invention with respect to a home telecommunication network and a visited telecommunication network. Such a terminology also comprises a first telecommunication network, being the home telecommunication network, and a second telecommunication network, being the visited telecommunication network. As such, the present invention is applicable to a generic case in which services provided in a first telecommunication network are to be consumed by a second telecommunication network.

In an example, the steps are performed in an order of;
a) receiving a service operation message,
b) retrieving list of available services,
c) determining that said home network is able to provide said service and,
d) selecting a service instance.

It was found that the list of available services may be retrieved upon receiving a request to execute a particular service. Another option is that the SDVN function retrieves the list of available services at a particular moment in time beforehand.

In another example, the SDVN function is implemented in:
   a standalone network node in said home telecommunication network;
   a home edge router in said telecommunication network, wherein said router is arranged to communicate with said visited telecommunication network;
   an NRF.

In accordance with the present disclosure, the SDVN function is considered a functionality which may be executed by any node in the telecommunication network. Preferably, the particular node arranged to perform the functionality of the present disclosure is located close to the edge of the telecommunication network. This reduces any overhead signaling.

As such, preferably, the SDVN functionality is implemented in a standalone network node, in a home edge router, i.e. gateway, or even in the NRF.

In a further example, the method comprises the step of registering home User Data Management, UDM, service instances in said home NRF for making said instances available for said service consumer in said visited telecommunication network.

In a further example, the step a) comprises:
   retrieving said list of available services within the home telecommunication network of said service consumer, wherein said list of available services is a list of services offered by said home telecommunication network to said service consumer.

The advantage of this particular example is that the list of available services is tailored to the specific service consumers. As such, each service consumer may be associated with a different list of available services that the service consumer is able to access.

In a further example, the step d) comprises
transmitting, by said SDVN function, a service operation message to a UDM;
receiving, by said SDVN function, a response from said UDM;
transmitting, by said SDVN function, said response towards said visited telecommunication network.

In a second aspect, there is provided a network node for supporting consumption of a service by a service consumer, wherein said service consumer is residing in a visited telecommunication network and is arranged to consume a service produced by a service producer, wherein said service producer is residing in a home telecommunication network. The network node comprises:
retrieve equipment arranged for retrieving, from a home Network Repository Function, NRF, a list of available services within the home telecommunication network that said service consumer is allowed to access, wherein said network node and said home NRF both reside in said home telecommunication network;
receive equipment arranged for receiving a service operation message requesting an operation execution within a particular service for said service consumer in said visited telecommunication network;
determine equipment arranged for determining that said home network is able to provide for said requested service based on said retrieved list of available services;
select equipment arranged for selecting one or more service instances for execution of said operation within said particular service for said service consumer.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the network node.

In an example, the network node is any of:
a standalone network node in said home telecommunication network;
a home edge router in said telecommunication network, wherein said home edge router is further arranged to communicate with said visited telecommunication network;
a Network Repository Function, NRF, network node.

In a further example, the network node further comprises:
register equipment arranged for registering home User Data Management, UDM, service instances in said home NRF for making said instances available for said service consumer in said visited telecommunication network.

In yet another example, the retrieve equipment is further arranged for:
retrieving said list of available services within the home telecommunication network of said service consumer, wherein said list of available services is a list of services offered by said home telecommunication network to said service consumer.

In an example, the select equipment is further arranged for:
transmitting a service operation message to a UDM;
receiving a response from said UDM;
transmitting said response towards said visited telecommunication network.

In a third aspect, there is provided a network node for supporting consumption of a service by a service consumer, wherein said service consumer is residing in a visited telecommunication network and is arranged to consume a service produced by a service producer, wherein said service producer is residing in a home telecommunication network, said network node comprising:
retrieve module for retrieving, from a home Network Repository Function, NRF, a list of available services within the home telecommunication network that said service consumer is allowed to access, wherein said network node and said home NRF both reside in said home telecommunication network;
receive module for receiving a service operation message requesting an operation execution within a particular service for said service consumer in said visited telecommunication network;
determine module for determining that said home network is able to provide for said requested service based on said retrieved list of available services;
select module for selecting one or more service instances for execution of said operation within said particular service for said service consumer.

In accordance with the present disclosure, different aspects applicable to the above mentioned examples of the methods and network nodes, including the advantages thereof, correspond to the aspects which are applicable to the third aspect.

In a fourth aspect, there is provided a computer program product, comprising a readable storage medium, comprising instructions which, when executed on at least one processor, cause the at least one processor to carry out the method according to any of the examples of the method as provided above.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a particular type of telecommunication network, SDVN function or anything alike. The examples are merely provided to provide for an insight of the present invention.

DESCRIPTION

Figure 1:
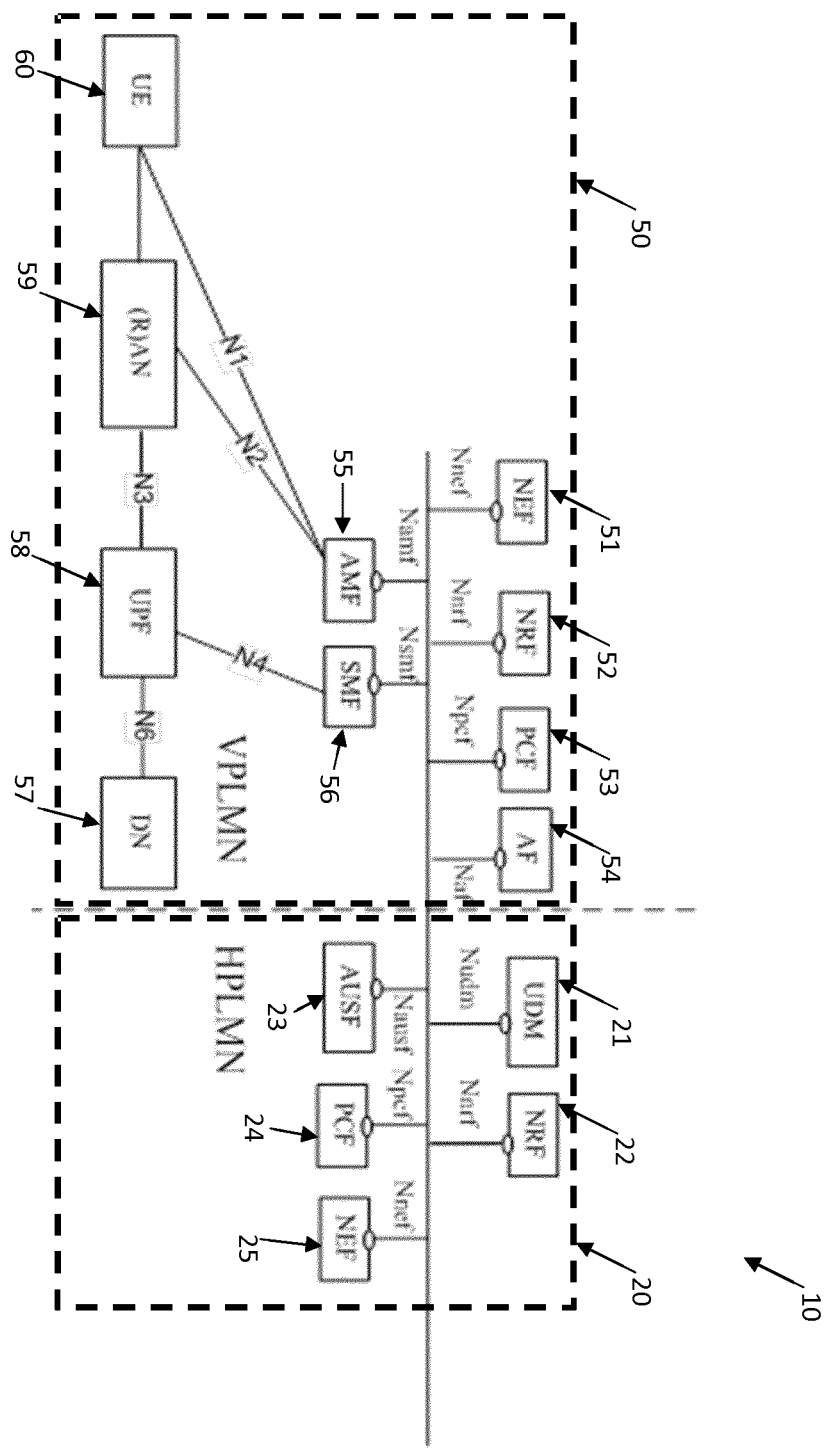
FIG. 1 shows a schematic block diagram of a User Equipment, UE, communicating in a 5G telecommunication network.

FIG. 1 shows a schematic block diagram of a User Equipment, UE, communicating in a 5G telecommunication network in accordance with the prior art. The schematic block diagram as indicated by reference number 10 is part of a standard, specifically 3GPP TS 23.501 v050 "System Architecture for 5G system". Specifically, FIG. 1 shows a system architecture for a user equipment, UE, 60 that is registered at, i.e. belongs to, a home network, 20 but is currently residing in a visited network 50.

The 5G telecommunication network shown in FIG. 1 is a service based architecture, SBA. It may be conceivable that a particular network node, or network function, requires a particular function or a service from the home network 20. The term Home Public Land Mobile Network, HPLMN, may be used to denote a Home Network 20 and similarly the term Visited Public Land Mobile Network, VPLMN, may be used to denote a Visited Network, 50.

The specification 23.501 v050 "System Architecture for 5G system" describes the architecture for the 5G system. In general, the 5G architecture comprises the following network functions or entities:

- Authentication Server Function, AUSF, 23;
- Core Access and Mobility Management Function, AMF, 55;
- Data network, DN, 57, e.g. operator services, Internet access or 3rd party services;
- Structured Data Storage network function, SDSF, not shown in the figure;
- Unstructured Data Storage network function, UDSF, not shown in the figure;
- Network Exposure Function, NEF, 25, 51;
- NF Repository Function, NRF, 22, 52;
- Network Slice Selection Function, NSSF, not shown in the figure;
- Policy Control function, PCF, 24, 53;
- Session Management Function, SMF, 56;
- Unified Data Management, UDM, 21;
- Unified Data Repository, UDR, not shown in the figure;
- User plane Function, UPF, 58;
- Application Function, AF, 54;
- User Equipment, UE, 60;
- (Radio) Access Network, (R)AN, 59.

The 5G service based architecture may be represented in two ways.

1. A service-based representation, where network functions, e.g. AMF, within the Control Plane enable other authorized network functions to access their services. This representation also includes point-to-point reference points where necessary.
2. A reference point representation, shows the interaction exist between the NF services in the network functions described by point-to-point reference point, e.g. N11, between any two network functions, e.g. AMF and SMF.

Network functions within the 5GC Control Plane shall only use service-based interfaces for their interactions.

The Service-based interfaces could be any of,
Namf: Service-based interface exhibited by AMF.
Nsmf: Service-based interface exhibited by SMF.
Nnef: Service-based interface exhibited by NEF.
Npcf: Service-based interface exhibited by PCF.
Nudm: Service-based interface exhibited by UDM.
Naf: Service-based interface exhibited by AF.
Nnrf: Service-based interface exhibited by NRF.
Nnssf: Service-based interface exhibited by NSSF.
Nausf: Service-based interface exhibited by AUSF.

The reference points could be any of,
N1: Reference point between the UE and the AMF.
N2: Reference point between the (R)AN and the AMF.
N3: Reference point between the (R)AN and the UPF.
N4: Reference point between the SMF and the UPF.
N6: Reference point between the UPF and a Data Network.
N9: Reference point between two Core UPFs.

Figure 2:
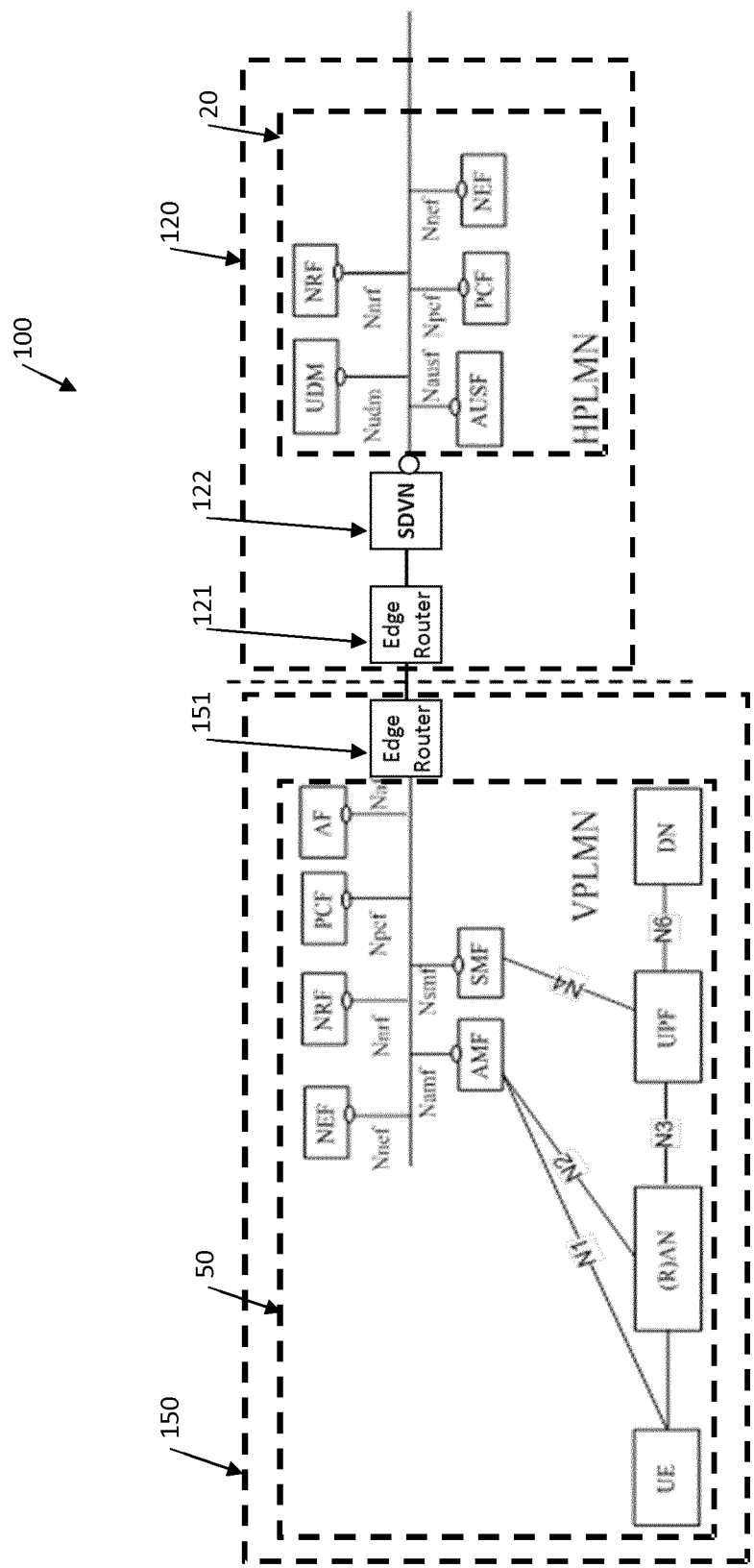
FIG. 2 shows a schematic block diagram of a user Equipment, UE, accessing services from a Home network, while being located in a visited network in a 5G telecommunication network.

FIG. 2 shows a schematic block diagram of a roaming User Equipment, UE, i.e. a UE currently residing in a visited telecommunication network and actually belonging to a home telecommunication network 120. The network according to reference number 100 indicates a home network 120 that comprises a first part 20 according to FIG. 1 and additional components such as an Edge Router, ER, 121 and a Service Discovery for Visited Networks, SDVN, node 122. Similarly, the visited network 150 comprises a first part 50 according to FIG. 1 and an additional Edge router 151.

The presented logical, or functional, module, SDVN 122 interfaces the edge router 121 and the Network functions as indicated with reference numerals 21-25 within the Home Network 120. From a deployment perspective, the SDVN 122 could be a standalone NF or alternatively it could be co-located in the Edge Router 121 of the Home network 120, or in the NRF 22 of the Home network 120.

The Network Function, SDVN 122, takes the role of an intermediate consumer of the services hosted, i.e. provided, in the Home Network 120 that are accessed from the visited network 150. The SDVN 122 may thus perform some sort of proxy service for the service consumers residing in the visited networks.

Such a service could be, for instance, the AMF 55 accessing the UDM 21. In accordance with the present disclosure, the SDVN 122 carries out service discovery operations with the home NRF 22 in order to get the list of available services within the Home network 120, which available services may be consumed in the visited telecommunication network.

The architecture shown in FIG. 2 may be used for supporting the method in accordance with the present disclosure.

The method is directed to the consumption, i.e. execution, of a service for a service consumer, wherein said service consumer is located in a visited telecommunication network and is consuming a service provided by a service producer, which service producer is located in the home telecommunication network. The service consumer may, for example, be the AMF that is residing in the visited network but may also be any other node, or network function, that is registered in the home network 120.

The presented method is thus directed to a situation in which an end-to-end flow, like e.g. UE registration, for a roaming user required that service consumers, i.e. network functions, in the visited telecommunication network access service producers, for example the UDM, in the home telecommunication network.

The method comprises the step of retrieving, by the Service Discovery from Visited Network, SDVN, function 122, from a home Network Repository Function, NRF 22, a list of available services within the home telecommunication network that said service consumer is allowed to access, wherein said SDVN function 122 and said home NRF 22 both reside in said home telecommunication network.

The above described steps results in the situation that the SDVN function 122 has the list of available services available, which services may be supported by the home network 120 for any service consumer in the visited network 150.

In a next step, the said SDVN function 122 may receive a service operation message requesting an operation execution within a particular service for said service consumer in said visited telecommunication network.

The above described two steps may be performed in any order. For example, the first described step may be triggered by the second step.

Subsequently, the SDVN function 121 may determine that said home network is able to provide for said requested particular service based on said retrieved list of available services. That is, the SDVN function 121 may correlate, or compare, the requested service with the list of available services to determine whether the home network is able to provide that particular service.

Finally, the SDVN function 121 selects one or more service instances for executing said operation within said particular service for said service consumer.

Following the above, the SDVN function 121 may act as an intermediate service consumer in the home telecommunication network for the service consumer residing in the visited telecommunication network.

Figure 3:
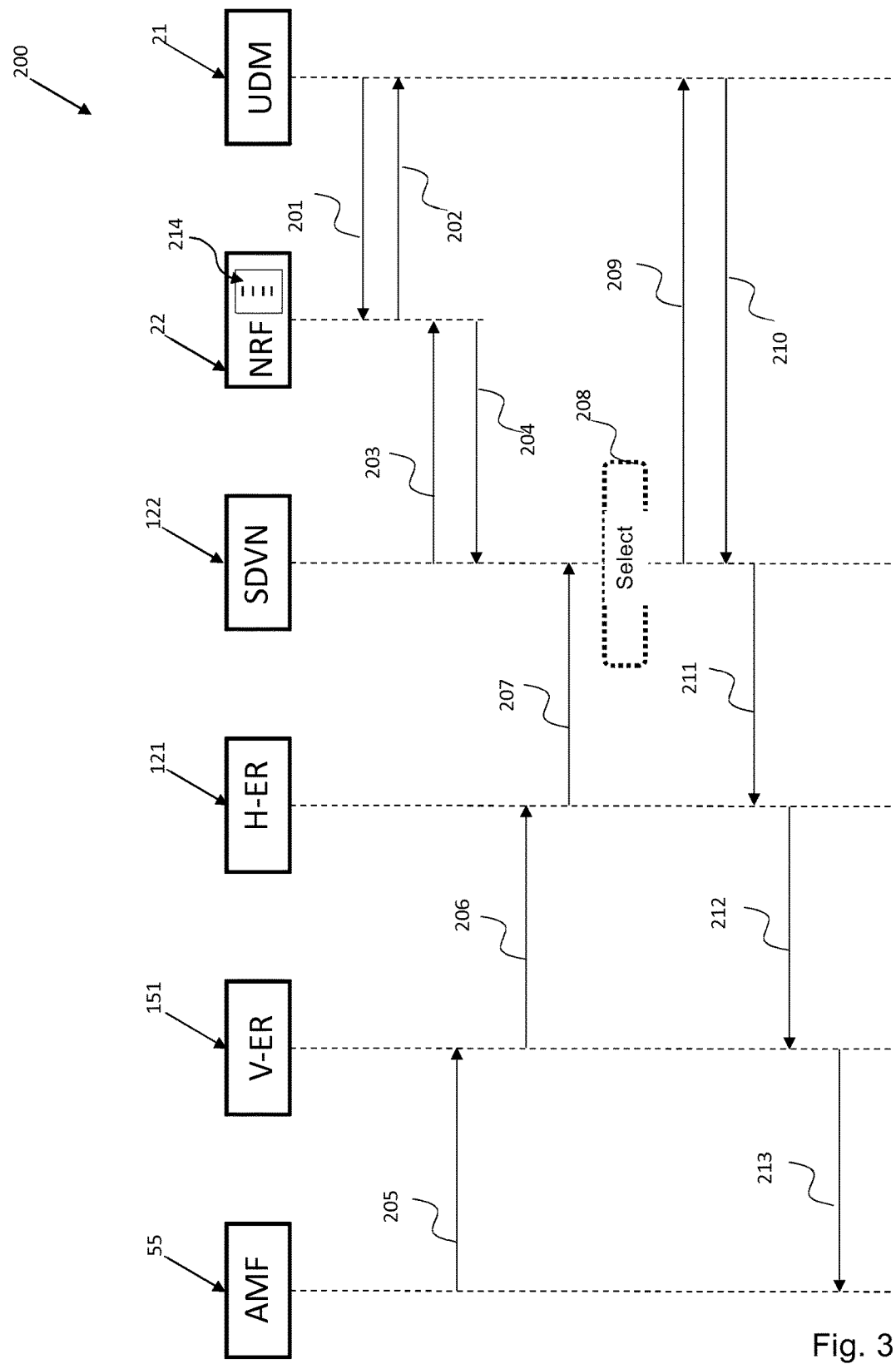
FIG. 3 shows a schematic signaling diagram illustrating an aspect of the present disclosure.

FIG. 3 shows a schematic signaling diagram illustrating an aspect of the present disclosure. The signaling chart in FIG. 3 indicated by reference number 200 provides a detailed overview of how a service consumer 55 in a visited network 150 can gain access to a service instance in the home network, 120.

The UDM service instances are registered by the home UDM 21, in the home NRF 22. As an example, for UDM services, UE context management service and User Data Management Service may be defined. The UDM 21 then registers 201 these service instances in the home NRF 22, in order to be made available by any service consumer. Here, it is noted that the service consumer may be an AMF or any other network function in the visited telecommunication network.

The SDVN 122 acts as an intermediate service consumer. Once the service instances are registered in the home NRF, an acknowledgement signal 202 may be provided by the home NRF 22 to the home UDM 21.

Within the home NRF 22, the service instances may be stored within a database. A compilation or a list 214 of available service instances may be made available within the home NRF 22 thereby facilitating ease of access by the service consumer such as the AMF. The SDVN 122 sends a request signal 203 to the home NRF 22 indicating to provide it with a list of available services 241 within the home network 120. Subsequent to the request signal 203, the list of available services 214 is provided 204 to the SDVN 122 node.

On the side of the visited network 150, the UE 60 sends a roaming request to the visited AMF 55. As a result of the roaming UE request, the visited AMF 55 may need to be registered as the serving node of that UE 60. To do so, it requires to use "Nudm_UE_Context_Management" service, more specifically, it uses a registration operation. But as the UDM is presently in the home network 120 of the UE, the service operation request needs to reach the corresponding service instance in the Home network 120. For that, it needs to first reach the visited network's Edge router 151. So the visited AMF 55 routes the service operation 205 for roaming users to the visited network's edge router, V-ER, 151.

When the visited network's edge router 151 receives the service operation request 205, it reaches the corresponding Home network's edge router, H-ER, 121. An edge router 121, 151 may be required at the edge of each network for, for example, topology hiding and security reasons. In step 206, the edge router of the visited network forwards the service request to the edge router of the corresponding home network.

The received service operation request 206 is forwarded to the SDVN in step 207. As noted earlier, the SDVN 122 acts as the service consumer of the operation in the home network 120. The SDVN may have previously discovered the services provided by the UDM 21, or it may carry out the service discovery operation right after the service operation request is received 206. The SDVN 122 then selects one 208 service instance from the received list 214 of instances.

As pointed out, the step of retrieving 203, 204 the list of available services instances 214 from the home NRF 22 may be performed separately or upon receiving a request from the service consumer. Accordingly, steps 203-204 may either be performed before receiving signal 207 or upon receiving signal 207. Preferably, the steps 203, 204 of retrieving the list of available services are performed prior to receiving a request from the service consumer. This enables the system to react faster to a demand by the service consumer.

Once a particular service instance has been selected in step 208, the selected operation request then reaches 209 the corresponding UDM service instance 21 and the service can be executed. Subsequently, the response is sent back 210-213 to the original requester in the visited network 150.

Figure 4:
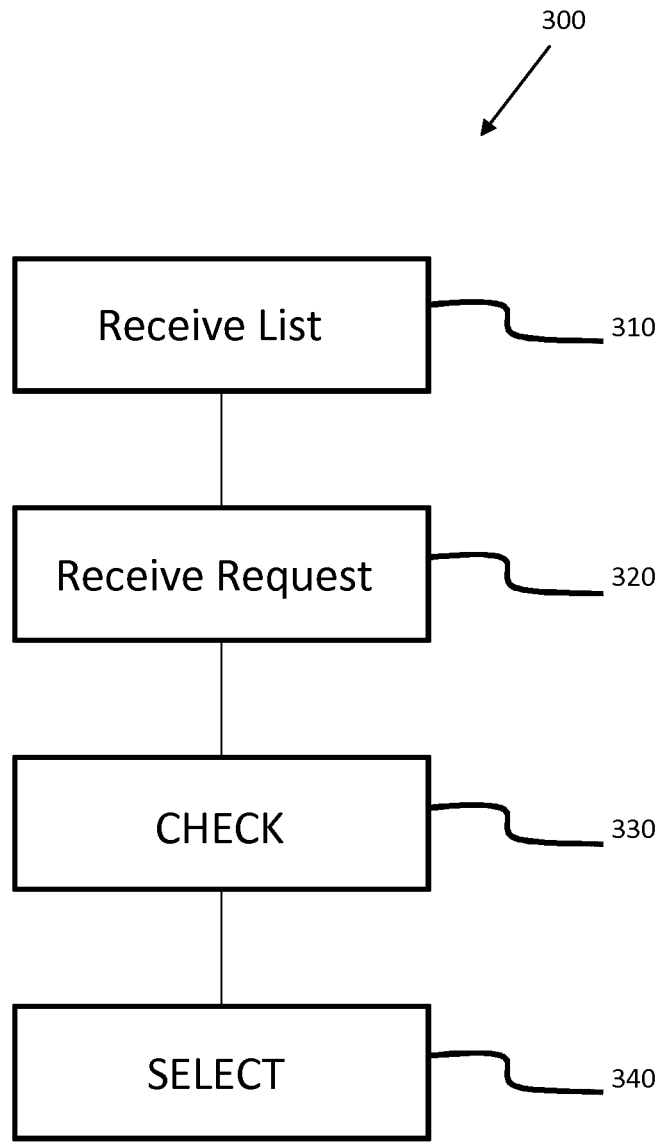
FIG. 4 is a schematic chart illustrating the basic steps involved in the method according to the present disclosure.

FIG. 4 shows a schematic representation of a method 300 according to the present invention. The first step 310, is the step of retrieving a list of available services within the home telecommunication network that a particular service consumer is allowed to access. The list of available services is initially available within a home UDM 21, which is then subsequently stored within the home NRF. Additionally, the step of retrieving 310 is performed by the SDVN 122. In a preferable embodiment, the service consumer is currently residing within a visited network 150 and the SDVN 122 and the NRF both reside within the home network 120. Within step 310, the list of available service is made available to the SDVN 122 by the home NRF 22.

In a step 320 of receiving, the SDVN receives a request for executing an operation pertaining to a particular service offered to a service consumer in a telecommunication network. The request is preferably in the form of a service operation message. It is noted here that the steps 310 and 320 may be performed in any order, i.e. step 310 may be performed first and then step 320 occurs or vice versa. In the situation where step 310 is performed after step 320, step 310 is triggered by the occurrence of step 320. In other words, extraction of list of available services from the home NRF 22 by the SDVN 122 is performed only if the SDVN receives a service operation message requesting the execution of a particular service.

In step 330, the SDVN determines whether the home network is able to provide the requested particular service based on said retrieved list of available services. This step of determining can be performed by checking if the received requested operation is specified within the list of available services specified within the home NRF 22.

Once the SDVN has determined that the requested service can be provided by the home network, the SDVN in step 340 selects one or more service instances for executing said operation within said particular service for said service consumer. In FIG. 4, the indicated steps are not restricted by a particular order. However the person skilled in the art is able to deduce that steps 330 and 340 may need to be performed sequentially as it is preferable to execute services only after determining if the home network is able to provide the service in the first place.

Figure 5:
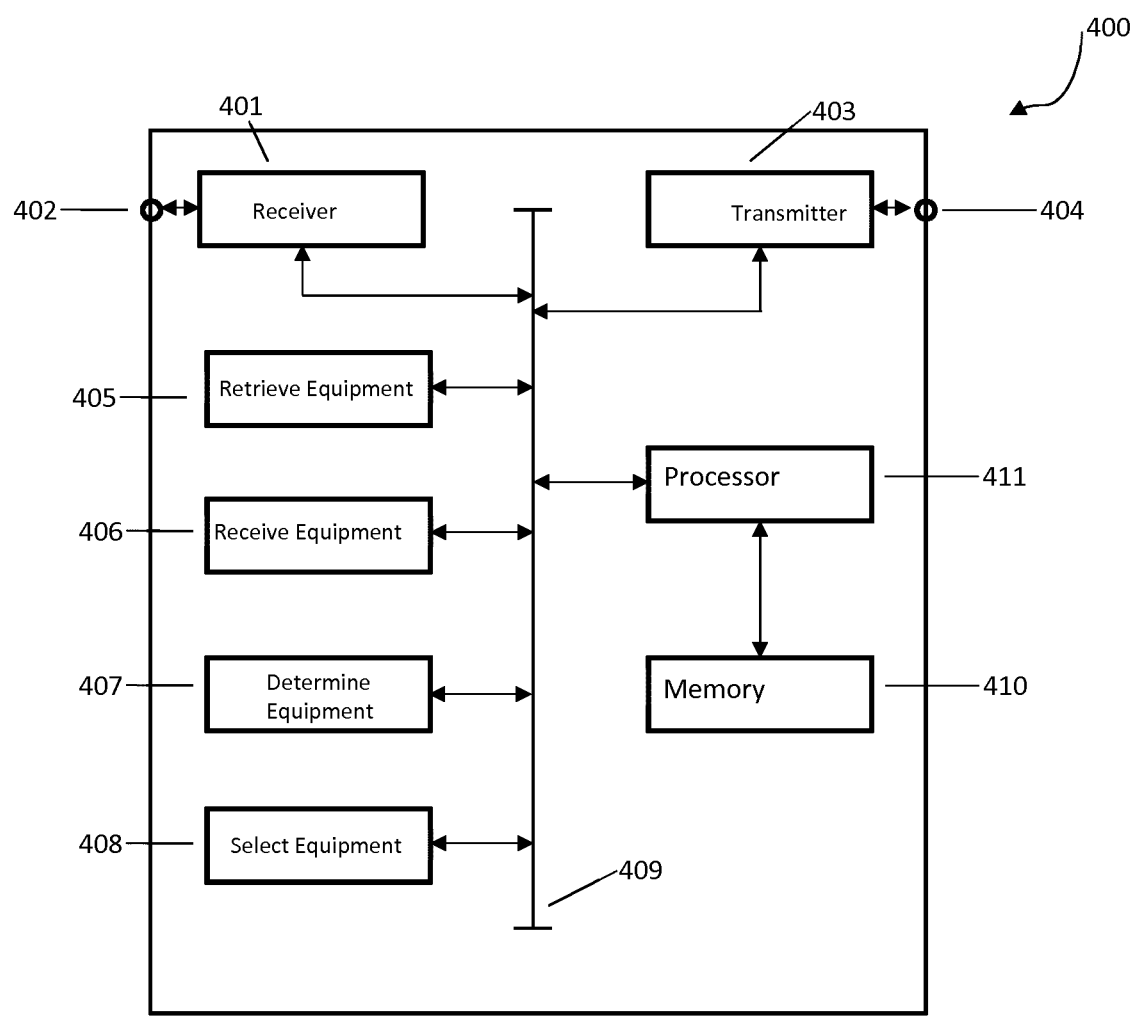
FIG. 5 is a schematic chart illustrating an embodiment of a User Equipment, UE/Base station.
Figure 1:
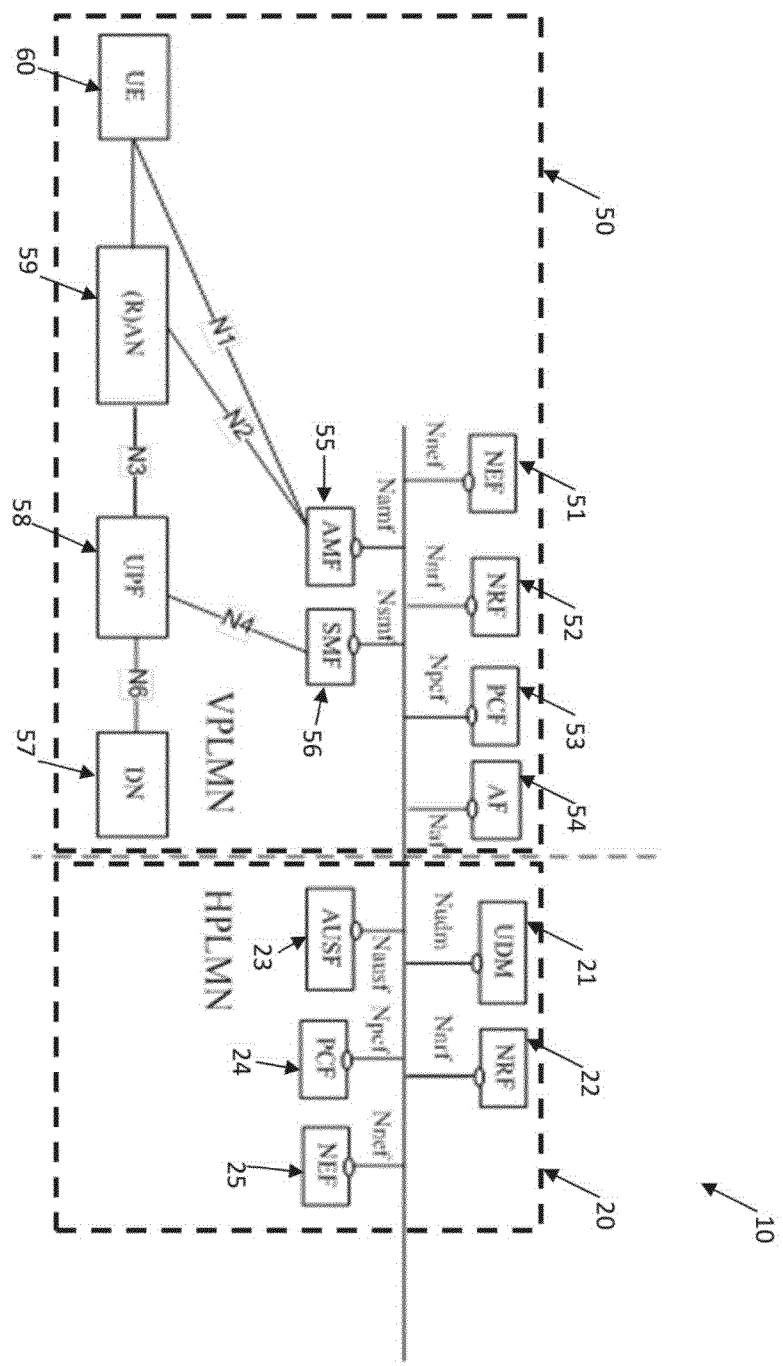

FIG. 5 is a schematic diagram illustrating an example, 400, of a network element, for example a node, which is capable of supporting the execution of a service for a service consumer in a visited network. The example, 400, comprises a receiver 401 coupled to receiving equipment 402 and a transmitter 403 coupled to transmitting equipment 404. The receivers 401, 402 and transmitters 403, 404 are arranged to communicate with external nodes or network functions in the telecommunication network. The network node 400 may be a standalone node in the telecommunication network. Alternately it may be integrated into another node, such as a home edge router or a network repository function, NRF, within the telecommunication network.

Within the network node 400, there is provided a retrieve equipment 405. The retrieve equipment 405 is arranged for retrieving a list of available services in the home telecommunication network. The retrieve equipment is arranged to communicate with a network repository function, NRF, within the home telecommunication network. The NRF maintains a list of available services that are provided by the home telecommunication network. The retrieve equipment 405 may further be arranged for extracting a list of services that are accessible by a specific user instead of extracting the entire list of services that the home network is capable of providing.

The network node 400 further comprises a receive equipment 405 which is arranged to receive a service operation message that requests a particular service for a consumer in the visited network. The determine equipment 407 is arranged for determining that the home network is able to provide the requested service.

The network node 400, further comprises of select equipment 408 which is arranged for selecting one or more services from an available list of services. The selection may be based on the nature of the request from the service consumer. The select equipment may further be arranged for transmitting a service operation message to a UDM and receiving a corresponding response. The select equipment may further be arranged for transmitting the response from the UDM towards a visited telecommunication network.

The person skilled in the art is able to conceive of additional equipment to add to the network node 400 in order to improve its functionality. One such example is the addition of a register equipment (not shown in figure), wherein the register equipment may be arranged for registering the available service instance provided by the home UDM and storing said available service instances as a list in the home NRF.

The example, 400, comprises a processor, 411 and a memory, 410. All the equipment, 405-408, interact with one another and with the processor 411 via a communication bus, 409.

In the description the terms "home network", "Home telecommunication network" have been used to refer to a Home Public Land Mobile Network, HPLMN. The term HPLMN is used in the standard for 5G networks and the definition as defined in the standard is applicable to the corresponding terms herein. Similarly, the terms "visited network", "visited telecommunication network" have been used to refer to a Visited Public Land Mobile Network, VPLMN. The term VPLMN is used in the standard for 5G networks and the definition as defined in the standard is applicable to the corresponding terms herein. It is further understood that the terms home network and visited network may only be understood in the context of a particular UE. The network in which the UE is originally registered is the Home network and the network in which the UE is currently residing is referred to as the visited network.

One of the advantages of the present disclosure is that a provision is provided in which a service consumer in a visited network is able to consume services that are provided by its home network.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof. Furthermore, the same reference sign in the figures refer to the same or a similar component performing a same or similar function.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of supporting consumption of a service by a service consumer, said service consumer residing in a visited telecommunication network and arranged to consume a service produced by a service producer, wherein said service producer is residing in a home telecommunication network, the method comprising:
   a. retrieving, by a Service Discovery from Visited Network (SDVN) function, from a home Network Repository Function (NRF), a list of available services within the home telecommunication network that said service consumer is allowed to access, wherein said SDVN function and said home NRF both reside in said home telecommunication network, wherein both said visited and home telecommunication networks have a Service Based Architecture (SBA) and said service consumer and service producer are network functions in the respective SBA:
   b. receiving, by said SDVN function, a service operation message requesting an operation execution within a particular service, produced by said service producer, for said service consumer in said visited telecommunication network;
   c. determining, by said SDVN function, that said home network is able to provide for said requested particular service produced by said service producer based on said retrieved list of available services; and
   d. selecting, by said SDVN function, one or more service instances of said particular service produced by said service producer for executing said operation within said particular service for said service consumer.

2. The method of claim 1, wherein the steps of claim 1 are performed in an order of: step b), step a), step c), step d), wherein said step a) is triggered by said step b).

3. The method of claim 1, wherein said SDVN function is implemented in:
a standalone network node in said home telecommunication network;
a home edge router in said home telecommunication network, wherein said router is arranged to communicate with said visited telecommunication network; and
an NRF.

4. The method of claim 1, further comprising:
registering home User Data Management (UDM) service instances in said home NRF for making said instances available for said service consumer in said visited telecommunication network.

5. The method of claim 1, wherein said step a) comprises:
retrieving said list of available services within the home telecommunication network of said service consumer, wherein said list of available services is a list of services offered by said home telecommunication network to said service consumer.

6. The method of claim 1, wherein said step d) comprises:
transmitting, by said SDVN function, a service operation message to a UDM;
receiving, by said SDVN function, a response from said UDM; and
transmitting, by said SDVN function, said response towards said visited telecommunication network.

7. A network node for supporting consumption of a service by a service consumer, wherein said service consumer is residing in a visited telecommunication network and is arranged to consume a service produced by a service producer, wherein said service producer is residing in a home telecommunication network, said network node comprising:
retrieve equipment configured to retrieve, from a home Network Repository Function (NRF), a list of available services within the home telecommunication network that said service consumer is allowed to access, wherein said network node and said home NRF both reside in said home telecommunication network, wherein both said visited and home telecommunication networks have a Service Based Architecture (SBA) and said service consumer and service producer are network functions in the respective SBA:
receive equipment configured to receive a service operation message requesting an operation execution within a particular service, produced by said service producer, for said service consumer in said visited telecommunication network;
determine equipment configured to determine that said home network is able to provide for said requested service produced by said service producer based on said retrieved list of available services; and
select equipment configured to select one or more service instances of said particular service produced by said service producer for execution of said operation within said particular service for said service consumer.

8. The network node of claim 7, wherein said network node is any of:
a standalone network node in said home telecommunication network;
a home edge router in said home telecommunication network, wherein said home edge router is further configured to communicate with said visited telecommunication network;
a Network Repository Function (NRF) network node.

9. The network node of claim 7, wherein said network node further comprises:
register equipment configured to register home User Data Management (UDM) service instances in said home NRF for making said instances available for said service consumer in said visited telecommunication network.

10. The network node of claim 7, wherein said retrieve equipment is further configured to retrieve said list of available services within the home telecommunication network of said service consumer, wherein said list of available services is a list of services offered by said home telecommunication network to said service consumer.

11. The network node of claim 7, wherein said select equipment is further configured to:
transmit a service operation message to a UDM;
receive a response from said UDM; and
transmit said response towards said visited telecommunication network.

12. A non-transitory computer-readable storage medium, comprising instructions which, when executed on at least one processor, cause the at least one processor to:
a. retrieve, by a Service Discovery from Visited Network (SDVN) function, from a home Network Repository Function (NRF), a list of available services within the home telecommunication network that a service consumer is allowed to access, wherein said service consumer resides in a visited telecommunication network and is configured to consume a service produced by a service producer, wherein said service producer is residing in a home telecommunication network, and wherein said SDVN function and said home NRF both reside in said home telecommunication network, wherein both said visited and home telecommunication networks have a Service Based Architecture (SBA) and said service consumer and service producer are network functions in the respective SBA:
b. receive, by said SDVN function, a service operation message requesting an operation execution within a particular service, produced by said service producer, for said service consumer in said visited telecommunication network;
c. determine, by said SDVN function, that said home network is able to provide for said requested particular service produced by said service producer based on said retrieved list of available services; and
d. select, by said SDVN function, one or more service instances of said particular service produced by said service producer for executing said operation within said particular service for said service consumer.

* * * * *

UNITED STATES PATENT AND TRADEMARK OFFICE
CERTIFICATE OF CORRECTION

| | | |
|---|---|---|
| PATENT NO. | : 10,939,277 B2 | Page 1 of 3 |
| APPLICATION NO. | : 16/638498 | |
| DATED | : March 2, 2021 | |
| INVENTOR(S) | : Bartolomé Rodrigo et al. | |

It is certified that error appears in the above-identified patent and that said Letters Patent is hereby corrected as shown below:

In the Drawings

Please replace Fig. 1 with Fig. 1 as shown on the attached page.

In the Specification

In Column 1, Line 37, delete "NF's," and insert -- NFs, --, therefor.

In Column 2, Line 52, delete "UDM, —User Data Repository," and insert -- UDM, and User Data Repository, --, therefor.

In Column 2, Lines 60-61, delete "order that" and insert -- order such that --, therefor.

In Column 4, Line 28, delete "of;" and insert -- of: --, therefor.

In Column 5, Line 6, delete "comprises" and insert -- comprises: --, therefor.

In Column 6, Line 59, delete "user" and insert -- User --, therefor.

In Column 7, Line 4, delete "DESCRIPTION" and insert -- DETAILED DESCRIPTION --, therefor.

In Column 7, Lines 57-58, delete "e.g. N11, between any two network functions, e.g. AMF" and insert -- , e.g. between any to network functions like N11 between AMF --, therefor.

In Column 7, Line 62, delete "of," and insert -- of: --, therefor.

In Column 8, Line 5, delete "of," and insert -- of: --, therefor.

In Column 9, Line 12, delete "SDVN function 121" and insert -- SDVN function 122 --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,939,277 B2

In Column 9, Line 15, delete "SDVN function 121" and insert -- SDVN function 122 --, therefor.

In Column 9, Line 20, delete "SDVN function 121" and insert -- SDVN function 122 --, therefor.

In Column 9, Line 23, delete "SDVN function 121" and insert -- SDVN function 122 --, therefor.

In Column 9, Line 52, delete "with a list if available services 241 within" and insert -- with the list 214 of available services within --, therefor.

In Column 11, Lines 31-32, delete "receive equipment 405" and insert -- receive equipment 406 --, therefor.

In Column 11, Line 58, delete ""Home" and insert -- "home --, therefor.

In the Claims

In Column 12, Line 54, in Claim 1, delete "SBA:" and insert -- SBA; --, therefor.

In Column 13, Line 47, in Claim 7, delete "SBA:" and insert -- SBA; --, therefor.

In Column 14, Line 46, in Claim 12, delete "SBA:" and insert -- SBA; --, therefor.